United States Patent
D'Arbonneau et al.

(10) Patent No.: US 9,483,885 B2
(45) Date of Patent: Nov. 1, 2016

(54) METHOD FOR DETECTING A FAILURE OF AT LEAST ONE SENSOR ONBOARD AN AIRCRAFT IMPLEMENTING WIND DETECTION, AND ASSOCIATED SYSTEM

(71) Applicant: DASSAULT AVIATION, Paris (FR)

(72) Inventors: Francois-Xavier D'Arbonneau, Le Chesnay (FR); Olivier Breton, Montreal (CA)

(73) Assignee: DASSAULT AVIATION, Paris (FR)

( * ) Notice: Subject to any disclaimer, the term of this patent is extended or adjusted under 35 U.S.C. 154(b) by 148 days.

(21) Appl. No.: 14/316,441

(22) Filed: Jun. 26, 2014

(65) Prior Publication Data

US 2015/0006021 A1   Jan. 1, 2015

(30) Foreign Application Priority Data

Jun. 28, 2013   (FR) ...................................... 13 01544

(51) Int. Cl.
| | |
|---|---|
| *G07C 5/00* | (2006.01) |
| *G07C 5/08* | (2006.01) |
| *G01P 5/16* | (2006.01) |
| *G01P 21/02* | (2006.01) |
| *B64D 45/00* | (2006.01) |

(52) U.S. Cl.
CPC ............ *G07C 5/0816* (2013.01); *B64D 45/00* (2013.01); *G01P 5/16* (2013.01); *G01P 21/025* (2013.01)

(58) Field of Classification Search
CPC ...... G05D 1/00; G01C 23/00; G07C 5/0816; B64D 45/00
See application file for complete search history.

(56) References Cited

U.S. PATENT DOCUMENTS

| | | | |
|---|---|---|---|
| 2007/0075893 A1* | 4/2007 | Filias | G01C 21/16 342/104 |
| 2011/0184592 A1* | 7/2011 | Elias | G01C 23/00 701/7 |
| 2012/0212369 A1 | 8/2012 | Revol et al. | |
| 2014/0046510 A1* | 2/2014 | Randolph | G01P 13/045 701/14 |

FOREIGN PATENT DOCUMENTS

| | | |
|---|---|---|
| EP | 2 348 285 A2 | 7/2011 |
| EP | 2 490 042 A2 | 8/2012 |

OTHER PUBLICATIONS

Imai et al., "A Programming Model for Spatio-temporal Data Streaming Applications," Procedia Computer Science, vol. 9 2012, pp. 1139-1148, XP028517307.
Imai et al., "A Programming Model for Spatio-temporal Data Streaming Applications," Procedia Computer Science, vol. 9 (2012), pp. 1139-1148, XP028517307.

* cited by examiner

*Primary Examiner* — Jelani Smith
(74) *Attorney, Agent, or Firm* — Davidson, Davidson & Kappel, LLC

(57) ABSTRACT

A method for detecting a failure of at least one sensor onboard an aircraft implementing wind detection is provided. The method includes measuring an airspeed of the aircraft; measuring a geographical speed of the aircraft; determining an instantaneous wind vector, based on the measured airspeed and geographical speed; establishing an instantaneous wind variation vector, based on the determined instantaneous wind vector; projecting the instantaneous wind variation vector on the direction of the vector of an air or geographical speed of the aircraft; and determining the presence of a failure based on the obtained projection.

12 Claims, 6 Drawing Sheets

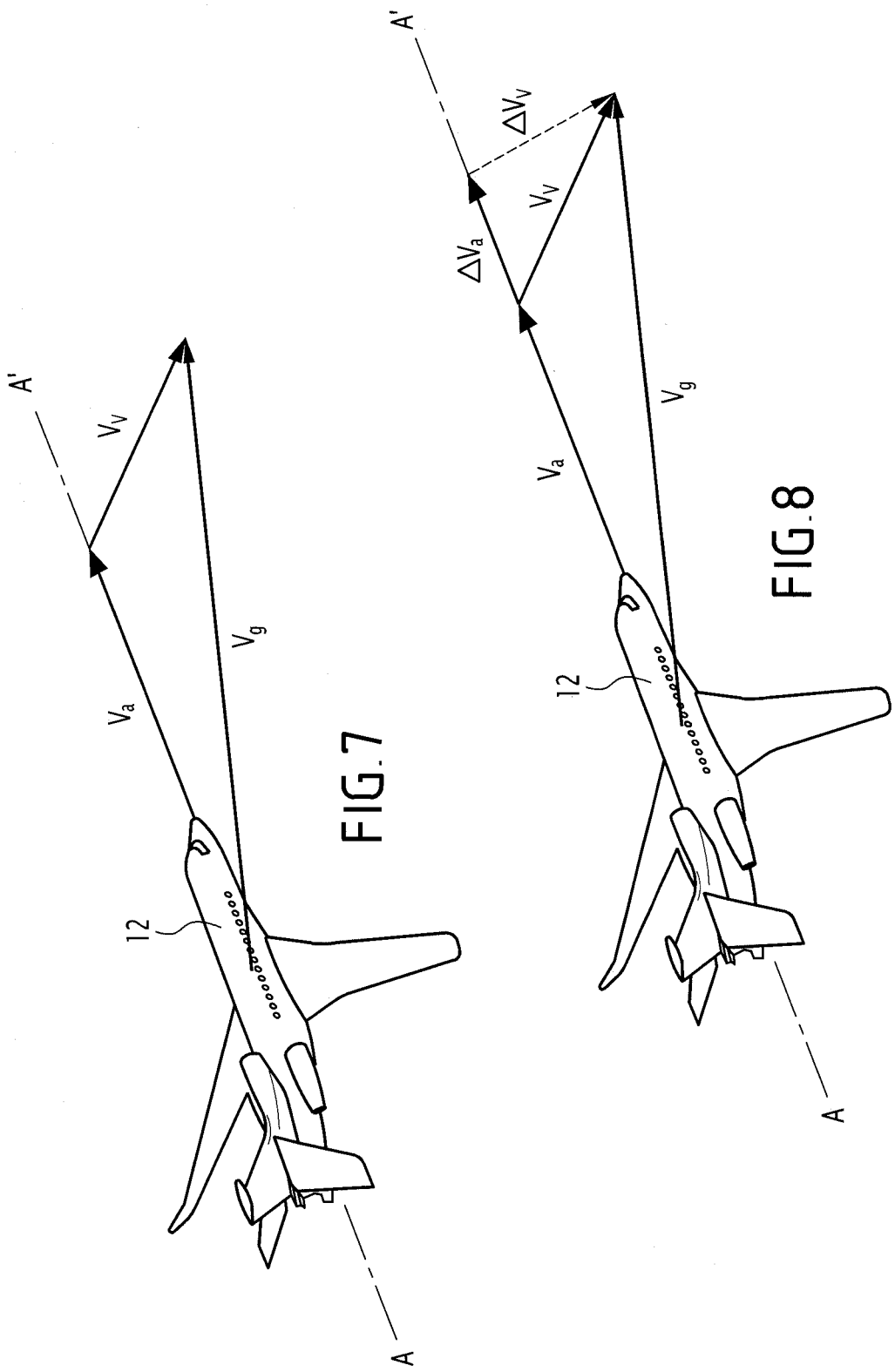

METHOD FOR DETECTING A FAILURE OF AT LEAST ONE SENSOR ONBOARD AN AIRCRAFT IMPLEMENTING WIND DETECTION, AND ASSOCIATED SYSTEM

This claims the benefit of French Patent Application FR 13 01544, filed Jun. 28, 2013 and hereby incorporated by reference herein.

The present invention relates to a method for detecting a failure of at least one sensor on board an aircraft including measuring an airspeed of the aircraft, measuring a geographical speed of the aircraft and determining an instantaneous wind vector, based on the measured airspeed and geographical speed.

Such a method is intended to be implemented in an aircraft, in order to provide failure detection information to the crew of the aircraft.

BACKGROUND

The piloting and guidance of an aircraft, whether manual or automatic, require the provision of precise information on different flight parameters, such as the altitude, airspeed, ground speed, attitude and incline of the aircraft.

The flight parameters are calculated from information collected by measuring sensors.

The reliability of the information provided on the flight parameters is critical for proper progression of the flight. In fact, these parameters are used not only directly by the pilot, when the latter takes the controls of the aircraft, but also by the computers intended to control the aircraft automatically, in particular to control the fly-by-wire system, automatic pilots, or automatic guides.

SUMMARY OF THE INVENTION

It is therefore important for the crew of the aircraft to be able to determine any malfunction that may interfere with the computation of the flight parameters as quickly as possible.

One major cause of malfunctions results from anomalies from the measuring sensors, which then provide erroneous information to the system.

The main sensors concerned for the calculation of flight parameters can be divided into two main families.

The first family relates to sensors of the "inertial" type that in particular participate in developing the ground speed. These sensors are typically the inertial units and the satellite positioning systems, such as GPS.

A second family relates to sensors of the "anemometric" type, which in particular participate in developing the airspeed. These sensors are typically probes and pressure sensors, such as static or dynamic pressure sensors, in particular such as Pitot tubes, and temperature sensors.

Incidents and accidents result directly or indirectly from anomalies on the sensors. These anomalies are for example measured attitude errors, erroneous GPS positions, erroneous total pressure measurements.

In particular, ice accretion of the pressure probes, the measurements of which are the basis for many current architectures, is a phenomenon involved in many events.

To detect the presence of any failures on the sensors, it is for example known to compare the data from several redundant sensors and to choose the most reliable data by vote.

Alternatively, the physical likelihood of the parameters, with respect to a likely range of values for each parameter, may be used.

Such detection methods have the drawback, however, of not being robust with respect to a shared failure point, for example ice accretion on all of the Pitot tubes, which leads to a set of total pressures that are coherent, likely and valid, but incorrect.

Other methods detect potential blockages by analyzing the pneumatic signal or by devices integrated into the probes. However, all cases of failures, in particular during ice accretion, are not necessarily well characterized, such that the anomalies may only be partially detected or not detected at all.

To offset this problem, it is known to compare anemometric parameters with an independent frame, of the inertial unit or GPS type. However, this comparison does not allow specific detection of the anomalies on specific sensors or on groups of sensors.

An object of the invention is therefore to have a simple and effective method for detecting anomalies occurring on sensors or elements in the anemometric chain.

A method for detecting a failure of at least one sensor onboard an aircraft is provided. The method includes:
   establishing an instantaneous wind variation vector, based on the determined instantaneous wind vector;
   projecting the instantaneous wind variation vector on the direction of the vector of an air or geographical speed of the aircraft; and
   determining the presence of a failure based on the obtained projection.

The method according to the invention may comprise one or more of the following features, considered alone or according to any technically possible combinations:
   the step for determining the presence of a failure includes comparing said projection with a given threshold;
   the value of the given threshold varies as a function of the flight phase;
   it includes a step for filtering said projection before the step for determining the presence of a failure, using an angular band pass filter centered on the direction of the air or geographical speed;
   the filtering step includes the normalization of the obtained projection in order to obtain a normalized projection, then setting the normalized projection to the power N;
   the projection step includes calculating the scalar product between the instantaneous wind variation vector and a unitary vector coaxial to the direction of the vector of an air or geographical speed of the aircraft;
   the step for establishing the instantaneous wind variation vector includes establishing a difference between the instantaneous wind vector and an average instantaneous wind;
   the average instantaneous wind is determined from a sliding average of the instantaneous wind vector;
   the step for establishing the instantaneous wind variation vector includes establishing a sum of differences between the instantaneous wind vector and the average instantaneous wind over a given period of time;
   it includes measuring the airspeed in an airplane frame, the measurement of the geographical speed being done in the platform frame, the step for determining the instantaneous wind vector including changing frames from the airspeed and/or the geographical speed;
   it includes activating an alarm when the presence of a failure is detected in the step for determining the presence of a failure.

A system for detecting a failure of at least one sensor onboard an aircraft is also provided. The system includes:

an assembly for measuring an airspeed of the aircraft;
an assembly for measuring a geographical speed of the aircraft;
an assembly for determining an instantaneous wind vector, based on the measured airspeed and geographical speed;
an assembly for establishing an instantaneous wind variation vector, based on the determined instantaneous wind vector;
an assembly for projecting the instantaneous wind variation vector on the direction of the vector of an air or geographical speed of the aircraft; and
an assembly for determining the presence of a failure based on the obtained projection.

BRIEF SUMMARY OF THE DRAWINGS

The invention will be better understood upon reading the following description, provided solely as an example, and done in reference to the appended drawings, in which:

FIG. 7 is a diagrammatic view illustrating the airspeed, ground speed and instantaneous wind vector with no failure; and FIG. 8 is a view similar to FIG. 7, during a failure of an anemometric sensor.

DETAILED DESCRIPTION

Figure 1:
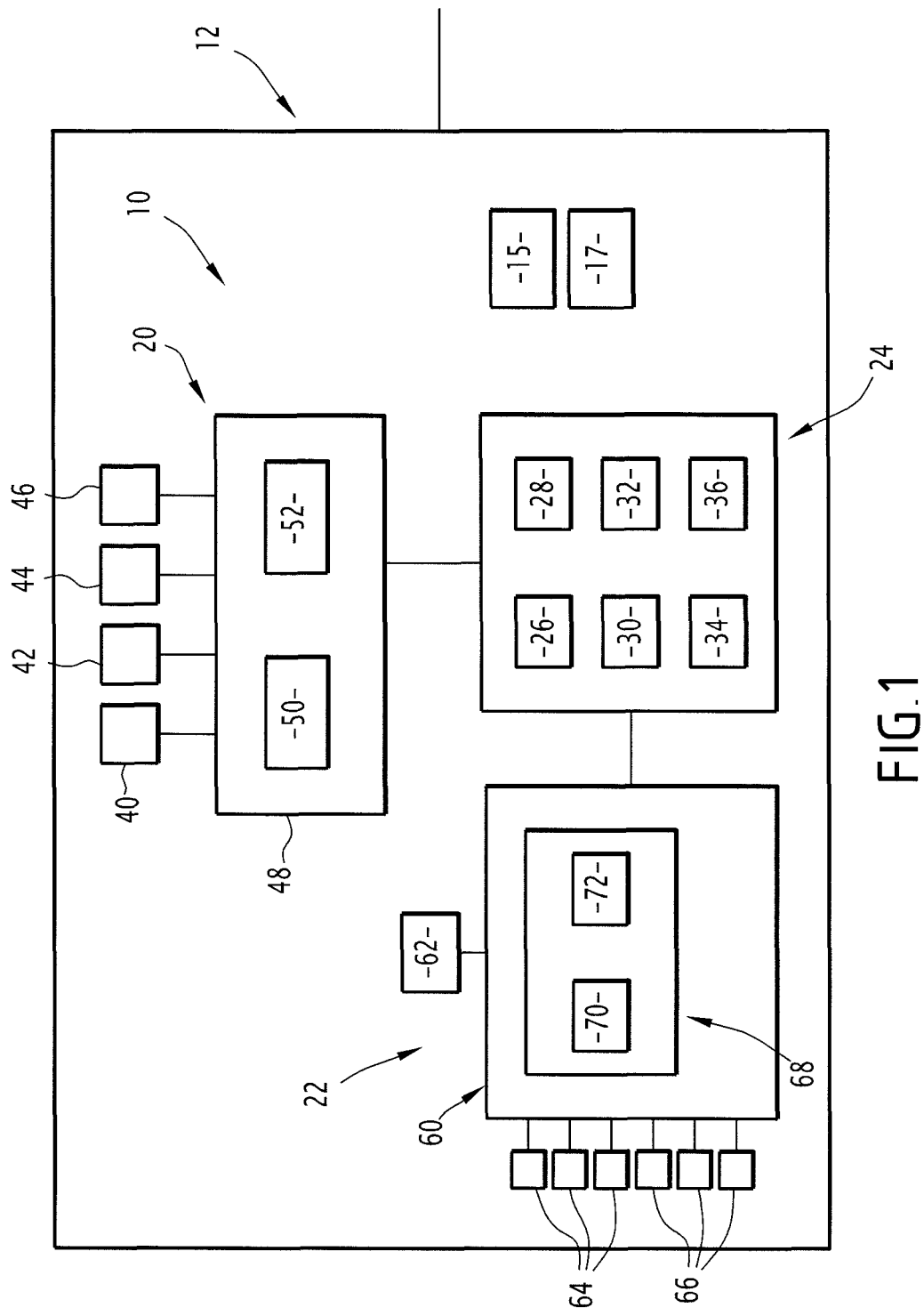
FIG. 1 is a view of a diagram diagrammatically illustrating a first detection system for the implementation of a method according to an embodiment of the invention.

A failure detection method according to an embodiment of the invention is implemented using a detection system, diagrammatically shown in FIG. 1.

The system 10 is arranged in a civilian or military aircraft 12, provided with an aircraft handling data display system 15 and an automatic control system 17 of the aircraft.

The system 10 includes a first assembly 20 for measuring at least one airspeed of the aircraft 12 and a second assembly 22 for measuring at least one geographical speed of the aircraft 12.

The system 10 further includes a failure detection computer 24 comprising an assembly 26 for determining an instantaneous wind vector Vx, based on data received from the assemblies 20, 22, an assembly 28 for establishing an instantaneous wind variation vector dW, and an assembly 30 for projecting the instantaneous wind variation vector dW on a direction of an airspeed or geographical speed vector of the aircraft 12.

The failure detection computer 24 further advantageously includes an assembly 32 for filtering the obtained projection, an assembly 34 for determining the presence of a failure based on the obtained projection, and an assembly 36 for activating an alarm when a failure is detected by the determining assembly 34.

The assembly 20 for measuring at least one airspeed includes at least one sensor 40 for measuring the static pressure Ps, typically of the parietal type, at least one sensor 42 for measuring the total pressure Pt, typically of the Pitot tube type, and at least one sensor 44 for measuring an incidence α of the aircraft, typically a wind indicator.

The assembly 20 further includes at least one sensor 46 for measuring a total temperature Tt and an anemometric computer 48, capable of computing a conventional speed Vc and/or an airspeed Va, based on data from the sensors 40 to 46.

In one embodiment, the anemometric computer 48 includes a module 50 for computing a Mach number M, based on data from the sensors for measuring the pressure 40, 42, and a module 52 for computing the airspeed Va, based on the Mach number calculated by the module 50 and data received from the sensors 44, 46 for measuring the incidence α and the total temperature Tt.

The assembly 22 for measuring a geographical speed includes a geographical positioning sensor of the aircraft 12 that includes an inertial unit 60, and/or at least one satellite positioning sensor 62 (designated using the acronym GPS), the inertial unit 60 for example being of the GPS hybrid type. The measuring assembly 22 further includes at least one computer 68.

In a known manner, the inertial unit 60 includes multiple sensors 64, 66 of metrological precision.

The computer 68 is connected to the precision sensors 64, 66, and advantageously to the satellite positioning sensor 62, to exploit the data from the sensors 62, 64, 66 in order to provide position, speed and attitude parameters usable by the pilot of the aircraft or by the control system 17.

The computer 68 here is shown in the inertial unit 60. Alternatively, the computer 68 or at least part thereof is situated outside the inertial unit 60.

Among the sensors 64, 66, the inertial unit 60 in particular includes several rate gyros 64, for example three. The rate gyros 64 provide angular speed of rotation values around their axes, in order each to determine a component of the angular speed vector (in particular pitch, roll or yaw speed).

The inertial unit 60 further includes several accelerometers 66, for example three, providing representative acceleration values along axes of the aircraft 12.

The computer 68 includes an inertial computation unit 70, capable of determining at least one pure inertial speed Vi coming from the sensors 64, 66 and/or at least one GPS hybrid inertial speed Vi'. The computer 68 further includes a unit 72 for computing a GPS speed, capable of determining a pure GPS speed, for example by Doppler effect.

At least one of the pure inertial speed Vi, the hybrid inertial speed Vi' or the GPS speed is used to develop a geographical speed Vg, in particular a ground speed Vs that will subsequently be used.

The failure detection computer 24 is for example shared with the computer 68 of the inertial unit 60. Alternatively, it consists of a computer different from the computer 68 of the inertial unit.

The determination assembly 26 is capable of computing the components of an instantaneous wind vector Vv, based on geographical speed data received from the computer 48 of the measuring assembly 22, and based on airspeed data received from the anemometric computer 68 of the inertial unit 60.

It includes a software module capable of changing the frame of the airspeed measured in an airplane frame to a platform frame, and/or changing an frame of the geographical speed measured in a platform frame to an airplane frame.

The airplane frame is connected to the longitudinal axis of the aircraft 12. It includes a first axial component along the longitudinal axis, and a second component perpendicular to the longitudinal axis, the second component being substantially horizontal when the longitudinal axis of the aircraft 12 is horizontal. The airplane frame includes a third component perpendicular to the longitudinal axis of the aircraft 12, that third component being vertical when the longitudinal axis of the aircraft 12 is horizontal.

Generally, the airspeed vector Va is measured in the airplane frame, using the measuring assembly 20.

The platform frame is connected to the inertial unit. It includes a first component oriented in a first given geographical direction, for example to the north, and a second component perpendicular to the first component, and oriented toward another given geographical direction, for example to the west. The platform frame includes a third vertical component, perpendicular to the first component and the second component.

Generally, the geographical speed vector Vg is measured in the platform frame, using the measuring assembly 22.

To compute the instantaneous wind vector Vv, the determination assembly 26 is capable of obtaining the vectorial difference between the measured geographical speed Vg, in particular the ground speed Vs, and the airspeed Va in a reference frame chosen from among the platform frame and the airplane frame.

The establishment assembly 28 is capable of computing the components of a vector dW of instantaneous wind variations, in the reference frame, based on the instantaneous wind vector Vv obtained by the determination assembly 26, and based on a computed average wind vector $\overline{Vv}$.

Preferably, the establishment assembly 28 includes a module for computing an average wind vector $\overline{Vv}$, based on several instantaneous wind vectors Vv measured successively, advantageously based on a sliding average of a plurality of instantaneous wind vectors Vv measured successively.

The sliding average is for example determined over a given time, optimized at the upper bound to limit the delay between the sliding average and the general evolution of the wind, in which a natural change in wind will be considered a variation.

The given time is also optimized at the lower bound so that unusual variations requiring detection have a minimal influence on the sliding average, so that they are detectable.

In one example, the given time is comprised between 1 minute and 10 minutes.

The establishment assembly 28 further includes a module for computing at least one difference $Vv-\overline{Vv}$, preferably a sum $\Sigma(Vv-\overline{Vv})$ of differences between a measured instantaneous wind vector Vv and the average wind vector $\overline{Vv}$.

The sum $\Sigma(Vv-\overline{Vv})$ is computed over a predetermined length of time, in order to smooth the random small-amplitude fluctuations of the wind, the variations of the wind being, over a short length of time, similar to a noise around an equilibrium value.

The predetermined duration is for example comprised between several tenths of a second and one second.

The vector dW is then made equal to the aforementioned sum.

The production assembly 30 includes a module for computing the scalar product PS between the instantaneous wind variation vector dW and a unitary vector coaxial to the direction of the vector of an air or geographical speed of the aircraft 12.

The computation module is for example capable of obtaining the scalar product PS between the wind variation vector dW and the airspeed Va, then dividing the obtained scalar product by the modulus of the airspeed Va.

The filtering assembly 32 is capable of eliminating the natural variations of the wind having non-zero components in the direction of the airspeed.

It advantageously includes an angular band pass filter centered on the direction of the airspeed.

The angular band pass filter here is implemented by means of a software module for normalizing the obtained projection PS in order to obtain a normalized projection, then setting the normalized projection to the power N, in order to obtain a scalar dW2.

The value of the power N to which the normalized projection is increased is representative of the angular cone of the filtering done. This value is for example greater than 100, in particular greater than 900, and in particular comprised between 900 and 1200.

A gap is for example obtained beyond ±5° relative to the direction of the unitary vector and a passage band of approximately ±2°.

The assembly 34 for determining the presence of the failure is capable of comparing the value of the obtained projection dW2 to determine whether that value is in a predetermined interval.

To that end, the determination assembly 34 is capable of comparing the value of the obtained projection dW2 with a predefined threshold value S defining at least one bound of the interval.

In particular, if the value of the obtained projection dW2 is below the threshold value S, the determination assembly 34 is capable of indicating the absence of a failure, whereas if the value of the obtained projection dW2 is above the threshold value S, the determination assembly 34 is capable of indicating the presence of a failure.

A method according to an embodiment of the invention for determining the presence of a failure of at least one sensor 40 to 46 will now be described in light of FIGS. 2 and 3.

Figure 2:
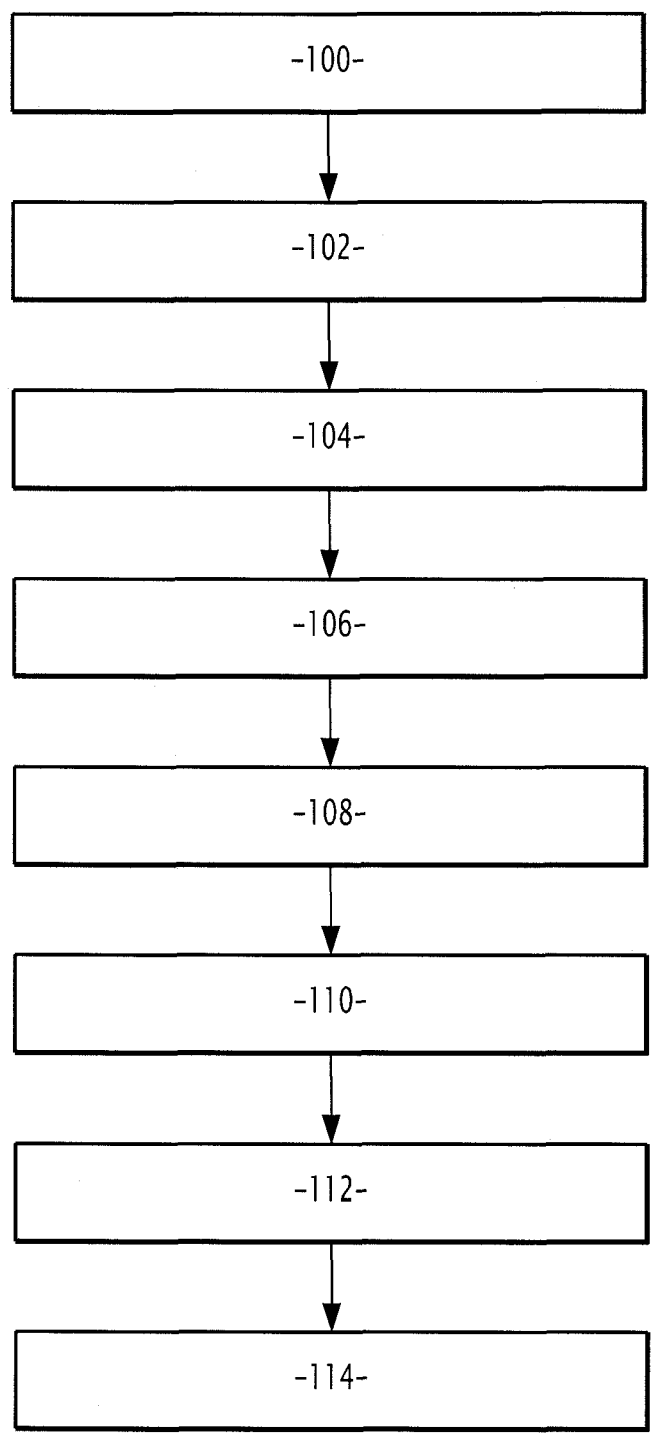
FIG. 2 is a functional summary view of the steps of the method according to an embodiment of the invention.
Figure 3:
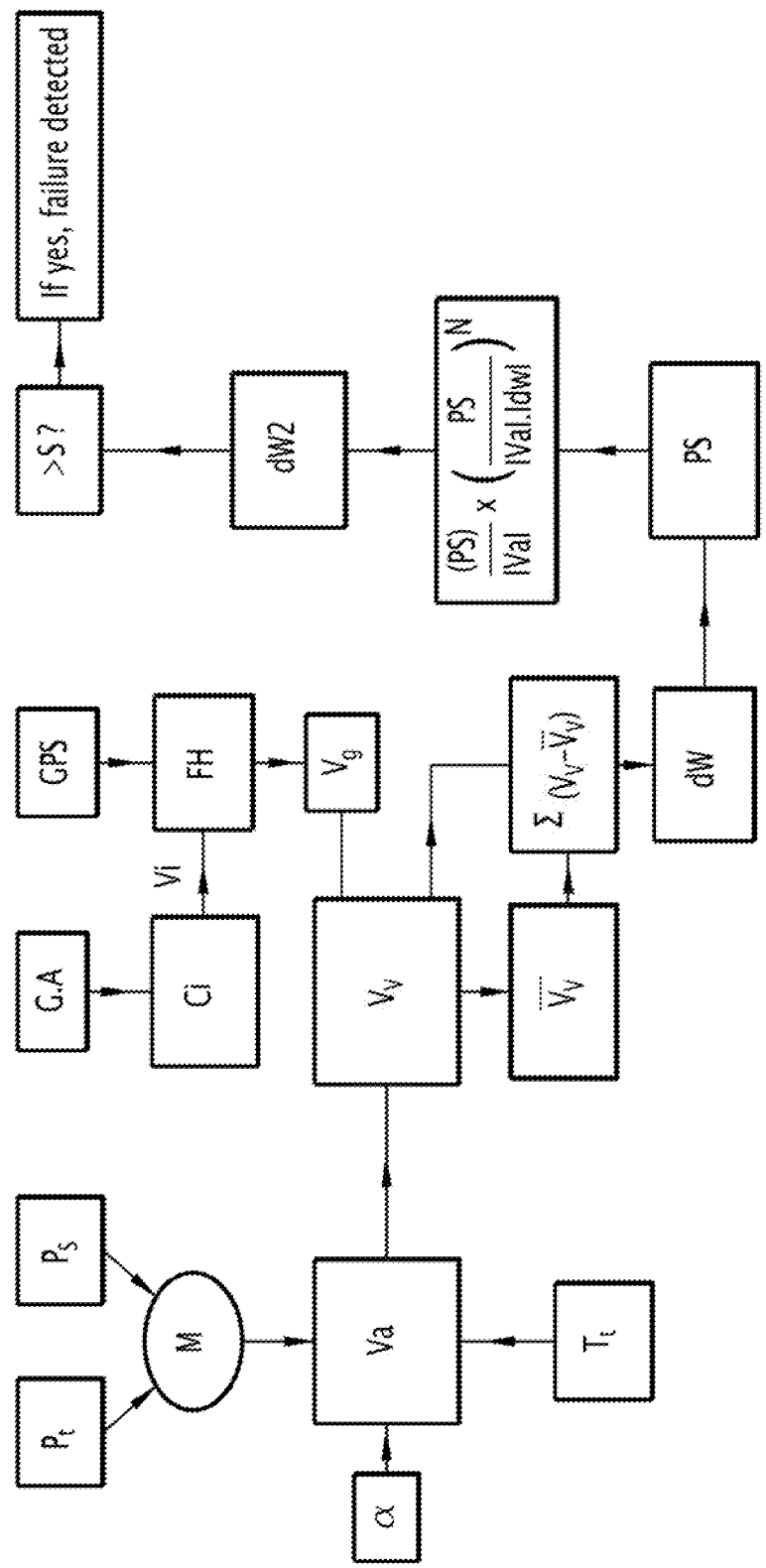
FIG. 3 is a block diagram illustrating the failure detection principle implemented by the method according to an embodiment of the invention.

In reference to FIG. 2, this method includes a step 100 for measuring an airspeed of the aircraft 12, and a simultaneous step 102 for measuring the geographical speed of the aircraft.

The method next includes a step 104 for determining an instantaneous wind vector Vv, based on the measured airspeed and geographical speed, and a step 106 for establishing an instantaneous wind variation vector dW, based on the instantaneous wind vector Vv determined in step 104.

The method further includes a step 108 for projecting the vector dW of the instantaneous wind variations on the direction of the vector of an air or geographical speed of the aircraft 12, and advantageously a step 110 for filtering said projection PS.

The method next includes a step 112 for determining the presence of a failure on one of the sensors of the aircraft 12 and, if a failure is determined, a step 114 for activating an alarm.

In step 100, the measuring assembly 20 determines, at each moment t, at a frequency for example comprised between 1 Hz and 100 Hz, an airspeed of the aircraft 12, taken along a longitudinal axis A-A' of the aircraft 12.

To that end, the step 100 includes the instantaneous measurement of the static pressure Ps by the sensor 40, the instantaneous measurement of the total pressure Pt by the sensor 42, and the measurement of the total temperature Tt by the temperature sensor 44.

Then, the anemometric computer 48 of the measuring assembly 20 computes a Mach number M, based on the dynamic pressure DP constituted by the difference Pt−Ps between the total pressure Pt and the static pressure Ps, and based on the static pressure Ps.

The anemometric computer 48 next computes the static temperature Ts as a function of the Mach number of the measured total temperature Tt. It further computes the velocity α of the sound in the air as a function of the static temperature Ts, then the airspeed Va by advantageously obtaining the product Va=α.M of the velocity of the sound α and the mock number M.

The airspeed Va follows the heading of the aircraft 12. It therefore extends vectorially along the longitudinal axis A-A' of the aircraft 12.

The step 102 includes the provision, by the rate gyros 64, of the angular speed of rotation values around their axes, in order each to determine a component of the angular speed vector (in particular pitch, roll, or yaw speed).

It includes the provision, by the accelerometers 66, of values representative of acceleration along the axes of the aircraft 12.

Step 102 further includes the provision, by the positioning sensor 62, of geographical positioning data of the aircraft 12 in a platform frame as defined above.

The computation units 70, 72 of the computer 68 then determine the components of at least one geographical speed Vg, in particular a ground speed Vs, based on the data received from the sensors 62 to 66.

In the platform reference, the ground speed Vs follows the route of the aircraft 12.

In step 104, the determination assembly 26 computes the components of an instantaneous wind vector Vv in a reference frame here consisting of the platform frame, based on geographical speed data received from the computer 48 of the measuring assembly 22, and based on airspeed data received from the anemometric computer 68 of the inertial unit 60.

Advantageously, the frame of the airspeed measured in an airplane frame and/or the geographical speed measured in the platform frame is changed.

In the example shown in the figures, an frame change is first applied to the airspeed Va determined vectorially in the airplane frame to obtain its components in the platform frame.

Then, the instantaneous wind vector Vv is determined by the assembly 26, by obtaining the vectorial difference between the geographical speed and the airspeed in the selected frame.

In particular, the components of the instantaneous wind vector Vv in the platform frame are obtained by obtaining the vectorial difference Vs−Va between the ground speed Vs and the airspeed Va in the platform frame.

In step 106, the establishment assembly 28 determines a vector dW of instantaneous wind variations, based on the instantaneous wind vector Vv determined in step 104.

To that end, the establishment assembly 28 first determines an average instantaneous wind $\overline{Vv}$. Preferably, the average instantaneous wind $\overline{Vv}$ is determined from a sliding average of the instantaneous wind vector Vv.

The sliding average is for example determined over a given length of time.

The value of the given length of time is adjusted based on the expected operations of the aircraft between an upper bound, avoiding excessive delay between the sliding average and the general evolution of the wind, and a lower bound, for which unusual variations detected by the system 10 have too direct an impact on the sliding average, and are no longer be detectable using that method.

Advantageously, the given length of time is comprised between 1 minute and 10 minutes.

Once the sliding average is determined, the establishment assembly 28 computes at least a difference Vv−$\overline{Vv}$ between the instantaneous wind vector Vv and the average wind vector $\overline{Vv}$ to obtain an instantaneous wind variation Vv−$\overline{Vv}$.

Preferably, in order to smooth the random small-amplitude fluctuations of the wind and measurements on using the sensors 62 to 66, similar to a noise around an equilibrium value, the establishment assembly 28 next obtains a sum $\Sigma(Vv-\overline{Vv})$ of the instantaneous wind variations Vv−$\overline{Vv}$ computed over a predetermined length of time.

The predetermined length of time is adjustable based on the expected operations of the aircraft 12, and the detection performance/false alarm rate compromise adopted for that parameter.

Advantageously, the predetermined length of time is comprised between 1/10 of a second and one second.

An instantaneous wind variation vector dW is thus obtained.

In step 108, the projection assembly 30 projects the obtained instantaneous wind variation vector dW on the direction of the vector of an airspeed of the aircraft 12, in particular on the direction of the vector of the airspeed Va.

Advantageously, the projection assembly 30 computes the scalar product PS between the instantaneous wind variation vector dW and the vector of the normalized airspeed Va, obtained by the ratio between the vector of the airspeed Va and the norm |Va| of that vector.

Next, in step 110, the filtering assembly 32 applies an angular band pass filter, centered on the direction of the airspeed Va.

The filtering preferably comprises the multiplication of the scalar product PS obtained in step 108 using the same completely standardized scalar product, i.e., divided by the product of the norm |dW| of the instantaneous wind variation vector dW and the norm of the airspeed |Va|.

The obtained product is increased to a high power N according to the equation:

$$dW2 = \frac{dW \cdot Va}{|Va|} \times \left(\frac{dW \cdot Va}{|Va| \times |dW|}\right)^N$$

The value of the power N to which the normalized projection is increased is representative of the angular cone of the filtering done. This value is for example greater than 100, in particular greater than 900, and in particular comprised between 900 and 1200.

This makes it possible to eliminate the small components of the natural variations of the wind on the direction of the airspeed. When N is approximately 2000, a gap of ±5° is obtained and a band pass of ±2° is then obtained.

The filtering therefore makes it possible to obtain a filtered projection dW2. This projection dW2 assumes a value far from zero when the scalar product PS obtained at the end of the projection step 108 has a value far from zero (which corresponds to an instantaneous wind vector moving away from the average wind), and when the observed variation is in the direction of the airspeed.

Aside from anomalies of a sensor 40 to 46, this dual condition only corresponds to a gust of wind situated strictly in the axis A-A' of the aircraft 12 and the probability of which is low.

In step 112, the determination assembly 34 compares the value of the projection dW with a predefined threshold value S.

Advantageously, if the value of the projection dW2 is below the predefined threshold value S, no failure is detected. On the contrary, if the value of the projection dW2 is above the predefined threshold value S, a failure is detected.

When a failure is detected in step 112, in step 114 the activation assembly 36 activates a visual and/or audio alarm for the crew of the aircraft.

The system 10 therefore detects a failure on an inertial sensor 62, 64, 66 or preferably on at least one sensor 40 to 44 or an element of the anemometric chain.

The obtained detection is therefore rapid and fairly selective, which orients the search by the crew toward a failure of one of these sensors.

Figure 4:
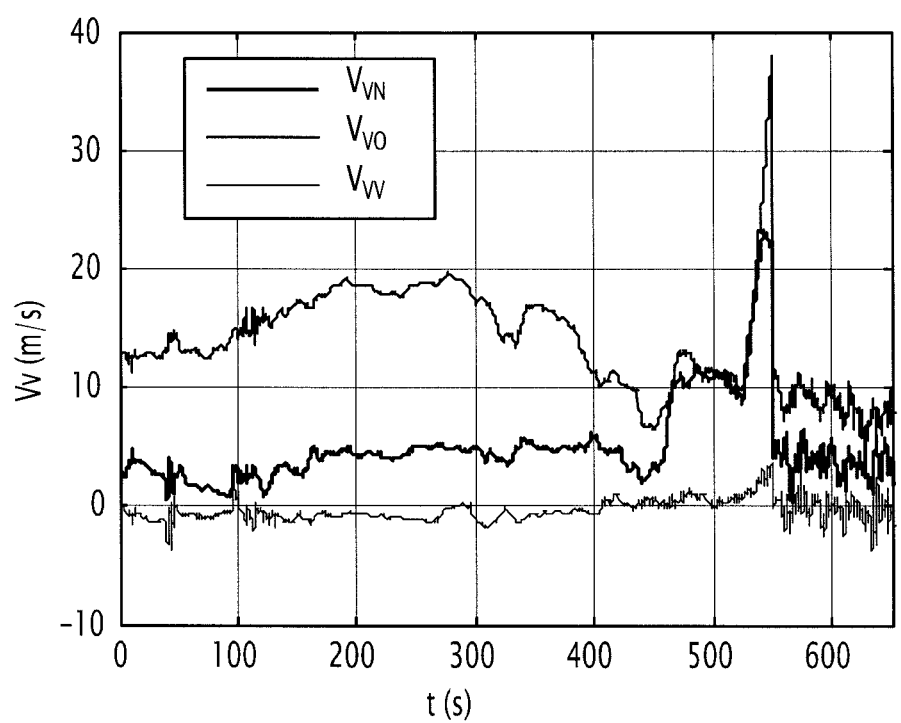
FIG. 4 is a graph illustrating the different components of the instantaneous wind vector as a function of time in a platform frame.
Figure 5:
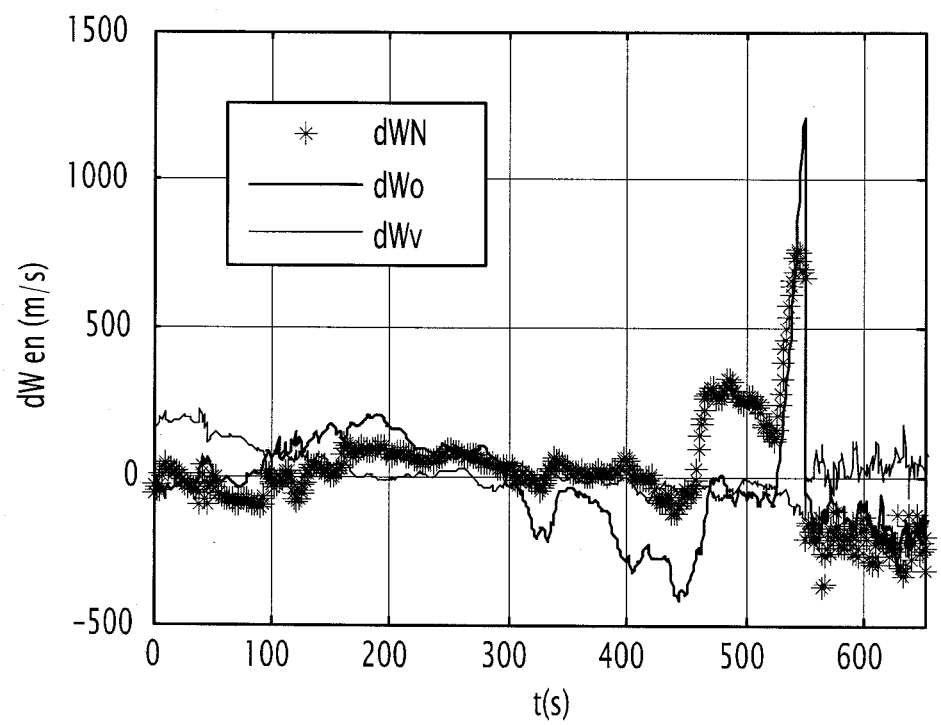
FIG. 5 is a graph illustrating the different components of the vector of the instantaneous wind variations as a function of time in a platform frame.
Figure 6:
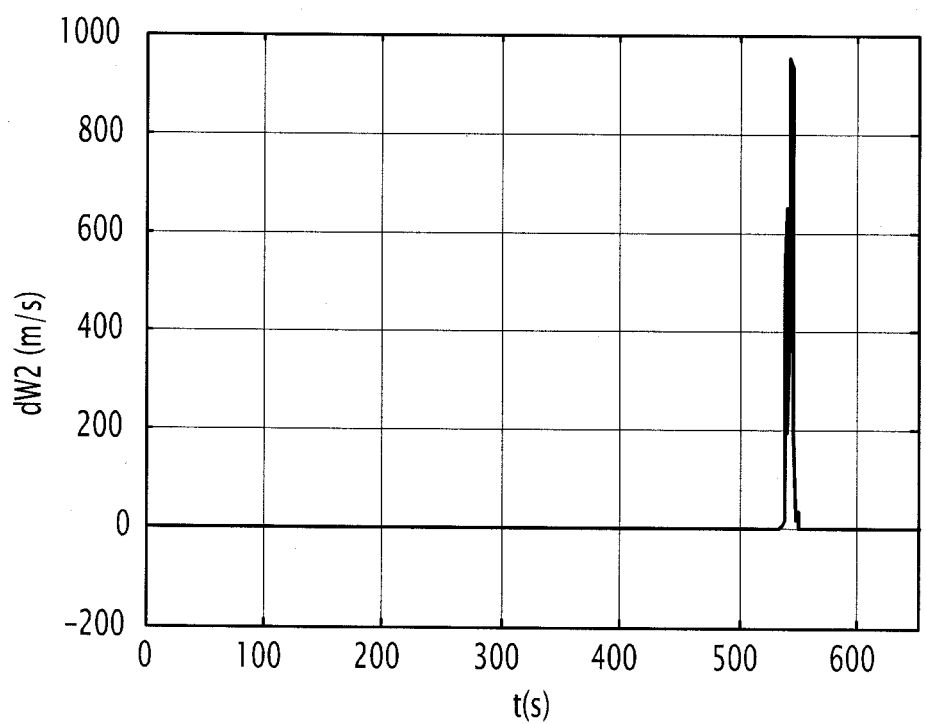
FIG. 6 is a graph illustrating the value of the filtered projection of the vector of the wind variations on the direction of the vector of the airspeed of the aircraft.

An example embodiment of the method according to the invention, using the system 10, is illustrated in FIGS. 4 to 6.

FIG. 4 shows the three geographical components of the instantaneous wind vector Vv obtained in step 104 of the method, as a function of time, in the platform frame.

FIG. 5 illustrates the three corresponding geographical components of the instantaneous wind variation vector dW obtained at the end of step 106, before the projection and filtering of that vector dW.

FIG. 6 illustrates the value of the filtered projection dW2 of the instantaneous wind variation vector Vv on the direction of the airspeed vector Va as a function of time.

Up to a time equal to approximately 520 seconds, the operation of the sensors 40 to 46 is normal.

As illustrated by FIG. 7, the wind vector Vv substantially corresponds to the difference between the ground speed Vs and the airspeed Va. No wind error is observed, and the projection dW2 of the instantaneous wind variation vector dW on the direction of the airspeed vector Va is substantially zero.

After projection and filtering, the scalar dW2 has a substantially zero value. No failure is detected by the detection assembly 34.

Starting at the time equal to approximately 520 seconds, the total pressure sensor 42 becomes blocked. The measured airspeed Va is then erroneous.

In that case, as shown in FIG. 8, a wind error is created in the direction of the airspeed Va. The instantaneous wind variation vector dW then has a non-zero value in that direction, which produces a non-zero projection PS. After filtering, the projection dW2 shows a very rapid and significant increase, which crosses the threshold value.

The failure detection assembly 34 then quasi-immediately detects a failure, which is signaled to the crew of the aircraft 12 by the activation assembly 36, to be handled by the crew.

Alternatively, other methods for developing the vector dW of the wind variations, the projection PS of that vector dW and/or the filtering of those variations may be done.

Furthermore, the comparison threshold of the obtained scalar may be made dependent on other flight parameters, for example the flight phase (leveled off, ascent, descent, etc.) based on the desired detection performance/false alarm rate compromise.

In the example described above, the projection PS is done on two axes, using the horizontal airspeed Va. Alternatively, the projection may be done on three axes, using all of the components of the airspeed Va.

In another alternative, the vector dW of the variations of the wind can be projected on the direction of the vector of a geographical speed Vg of the aircraft, such as the ground speed Vs.

This projection preferably detects anomalies on the geographical sensors 62, 64, 66, such as the inertial sensors or the geographical positioning sensors.

A combination of monitoring based on the projection of the vector dW of the wind variations over an airspeed and a monitoring based on the projection of the wind variation vector dW over a geographical speed covers all of the sensors 62, 64, 66 of the inertial world and the sensors 40 to 46 of the anemometric world.

What is claimed is:

1. A method for detecting a failure of at least one sensor onboard an aircraft, including:
   measuring an airspeed of the aircraft;
   measuring a geographical speed of the aircraft;
   determining an instantaneous wind vector based on the measured airspeed and geographical speed;
   establishing an instantaneous wind variation vector based on the determined instantaneous wind vector;
   projecting the instantaneous wind variation vector on a direction of a vector of an air or geographical speed of the aircraft to obtain an instantaneous wind variation vector projection; and
   determining a presence of a failure based on the instantaneous wind variation vector projection.

2. The method as recited in claim 1 wherein the determining the presence of a failure includes comparing the instantaneous wind variation vector projection with a given threshold.

3. The method as recited in claim 2 wherein a value of the given threshold varies as a function of a flight phase.

4. The method as recited in claim 1 further comprising filtering the instantaneous wind variation vector projection, before the determining the presence of a failure, using an angular band pass filter centered on the direction of the air or geographical speed.

5. The method as recited in claim 4 wherein the filtering the instantaneous wind variation vector projection includes normalizing the instantaneous wind variation vector projection in order to obtain a normalized projection, then setting the normalized projection to a power N.

6. The method as recited in claim 1 wherein the filtering the instantaneous wind variation vector projection includes calculating a scalar product between the instantaneous wind variation vector and a unitary vector coaxial to the direction of the vector of an air or geographical speed of the aircraft.

7. The method as recited in claim 1 wherein the establishing the instantaneous wind variation vector includes establishing a difference between the instantaneous wind vector and an average instantaneous wind.

8. The method as recited in claim 7 wherein the average instantaneous wind is determined from a sliding average of the instantaneous wind vector.

9. The method as recited in claim 7 wherein the establishing the instantaneous wind variation vector includes establishing a sum of differences between the instantaneous wind vector and the average instantaneous wind over a given period of time.

10. The method as recited in claim 1 further comprising measuring the airspeed in an airplane frame, the measuring the geographical speed being done in a platform frame, the determining the instantaneous wind vector including changing frames from the airspeed and/or the geographical speed.

11. The method as recited in claim 1 further comprising activating an alarm when the presence of a failure is detected in the step for determining the presence of a failure.

12. A system for detecting a failure of at least one sensor onboard an aircraft comprising:
   an aircraft airspeed measurer configured to measure an airspeed of the aircraft;
   an aircraft geographical speed measurer configured to measure a geographical speed of the aircraft;
   an instantaneous wind vector determiner configured to determine an instantaneous wind vector based on the measured airspeed and geographical speed;
   an instantaneous wind variation vector establisher configured to establish an instantaneous wind variation vector based on the determined instantaneous wind vector;
   an instantaneous wind variation vector projector configured to project the instantaneous wind variation vector on a direction of a vector of an air or geographical speed of the aircraft to obtain an instantaneous wind variation vector projection; and
   a failure presence determiner configured to determine a presence of a failure based on the instantaneous wind variation vector projection.

* * * * *